United States Patent
Liu et al.

(10) Patent No.: US 10,581,207 B2
(45) Date of Patent: Mar. 3, 2020

(54) POWER OUTLET DEVICE AND CONTROLLING METHOD THEREOF

(71) Applicant: CYBER POWER SYSTEMS, INC., Taipei (TW)

(72) Inventors: Yen-Nan Liu, Taipei (TW); Chih-Hao Hsu, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 176 days.

(21) Appl. No.: 15/873,415

(22) Filed: Jan. 17, 2018

(65) Prior Publication Data

US 2019/0067885 A1 Feb. 28, 2019

(30) Foreign Application Priority Data

Aug. 25, 2017 (TW) .............................. 106128911 A

(51) Int. Cl.
| | |
|---|---|
| *H01R 13/66* | (2006.01) |
| *H02J 9/00* | (2006.01) |
| *H01R 25/00* | (2006.01) |
| *H01R 13/70* | (2006.01) |

(52) U.S. Cl.
CPC ..... *H01R 13/6691* (2013.01); *H01R 13/6683* (2013.01); *H02J 9/005* (2013.01); *H01R 13/665* (2013.01); *H01R 13/70* (2013.01); *H01R 25/006* (2013.01)

(58) Field of Classification Search
CPC ............ H01R 13/6691; H01R 13/6683; H01R 13/665; H01R 13/70; H01R 25/006; G06F 1/266; H02J 9/005
See application file for complete search history.

(56) References Cited

U.S. PATENT DOCUMENTS

2011/0169342 A1* 7/2011 Tinaphong ......... H01R 13/6683
307/126

FOREIGN PATENT DOCUMENTS

| | | |
|---|---|---|
| CN | 2850053 Y | 12/2006 |
| CN | 1981255 A | 6/2007 |

* cited by examiner

*Primary Examiner* — Robert L Deberadinis
(74) *Attorney, Agent, or Firm* — Bacon & Thomas, PLLC

(57) ABSTRACT

A power outlet device including a first socket assembly coupled to an external power, a first switch, a detecting circuit coupled to the first socket assembly through the first switch, a controller is electrically coupled to the first switch and the detecting circuit, and a sensor is provided. The first switch is electrically coupled to the first socket assembly for turning on or off power supply of the external power to the first socket assembly. The detecting circuit detects a first power value of the first socket assembly. A second power value of the first socket assembly is detected after detecting the first power value. The controller read the first and second power value. A first signal is received by the sensor for transmitting to the controller. The controller turns on or off the first switch according to the first signal, the first and second power value. A controlling method of the power outlet device is further provided.

20 Claims, 3 Drawing Sheets

POWER OUTLET DEVICE AND CONTROLLING METHOD THEREOF

BACKGROUND OF THE INVENTION

Field of the Invention

The present invention relates to a power outlet device and a controlling method thereof, and more particularly, the present invention relates to a power outlet device and a controlling method thereof with efficiency of energy saving.

Description of Related Art

With the popularity of electrical products and the development of wireless remote control technology, users are accustomed to the use of remote controller to carry out the operation of electrical products, such as turning-on operation or turning-off operation for electrical products. However, even if working power of the electrical products has been turned off, but the plugs of electrical products are still plugged in power outlet. In other words, the electrical products are still in standby mode, which causes energy consuming and does not meet the requirements of energy saving.

SUMMARY OF THE INVENTION

Accordingly, an object of the present invention is, to provide a power outlet device and a controlling method thereof for taking into account the requirement of energy saving when uses electrical products.

To achieve the foregoing and other objects, a power outlet device including a first socket assembly, a first switch, a detecting circuit, a controller and a sensor is provided. The first socket assembly is electrically coupled to an external power and has, at least one first socket. At least one load is electrically coupled to the first socket assembly. The first switch is electrically coupled to the first socket assembly for turning on or off power supply of the external power to the first socket assembly. The detecting circuit is electrically coupled to the first socket assembly through the first switch, and detects a first power value of the first socket assembly when the first switch is turned on. When the first power value is detected, a second power value of the first socket assembly can be detected by the detecting circuit. The controller is electrically coupled to the first switch and the detecting circuit respectively, and reads the first power value and the second power value. A first signal is received by the sensor for transmitting to the controller. Wherein, the controller turns on or off the first switch according to the first signal, the first power value and the second power value.

In one embodiment of the present invention, when the first switch is turned on, the load is in standby mode, and then the detecting circuit detects the first power, value of the first socket assembly, the first power value is a standby power value.

In one embodiment of the present invention, the controller turns on the first switch when the sensor receives the first signal, the controller turns on the first switch continuously when the second power value is greater than the first power value, the controller turns off the first switch when the second power value is not greater than the first power value.

In one embodiment of the present invention, the power outlet device further includes a resetting unit and a reminding unit, the resetting unit sends a resetting signal to the controller, the controller turns on the first switch when receives the resetting signal, and makes the detecting circuit detect the first power value of the first socket assembly, and the reminding unit receives a reminding signal sent by the controller for generating a reminding message and turning off the first switch when the second power value is not greater than the first power value.

In one embodiment of the present invention, the sensor, the resetting unit and the reminding unit are electrically coupled to the controller in wired or wireless way.

In one embodiment of the present invention, the sensor is suitable for receiving a second signal, the controller turns off the first switch when the first power value of the first socket assembly is detected by the detecting circuit, and turns on the first switch again for detecting the second power value of the first socket assembly by the detecting circuit when the sensor receives the second signal.

In one embodiment of the present invention, at least one of the first signal and the second signal is sent by the load or a corresponding remote controller of an external load without coupling to the first socket assembly.

In one embodiment of the present invention, the power outlet device further includes a second socket assembly, the second socket assembly has at least one second socket, wherein the detecting circuit is electrically coupled between the second socket assembly and the first switch.

In one embodiment of the present invention, the power outlet device further includes a second switch coupled to the external power, and the second socket assembly and the detecting circuit are electrically coupled to the second switch.

In one embodiment of the present invention, the controller and the detecting circuit are electrically coupled to the second switch, a third signal is suitable for transmitting to the controller when the second switch is turned on, and the controller turns on the first switch according to the third signal.

A controlling method of the power outlet device is provided, which including the following steps:

providing a power outlet device, the power outlet device includes a first socket assembly, a first switch, a detecting circuit, a controller and a sensor. Wherein, the first socket assembly is electrically coupled to an external power, and has at least one first socket. At least one load is electrically coupled to the first socket assembly. The first switch is electrically coupled to the first socket assembly for turning on or off power supply of the external power to the first socket assembly. The detecting circuit is electrically coupled to the first socket assembly through the first switch. The controller is electrically coupled to the first switch and the detecting circuit respectively;

a first signal is received by the sensor for transmitting to the controller;

the controller turns on the power supply of the external power to the first socket assembly according to the first signal;

the detecting circuit detects a first power value of the first socket assembly, and then detects a second power value of the first socket assembly after detecting the first power value; and the controller reads the first power value and the second power value, and turns on or off the first switch according to the first power value and the second power value.

BRIEF DESCRIPTION OF THE DRAWINGS

Other features and advantages of the present invention will become apparent in the following detailed, description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
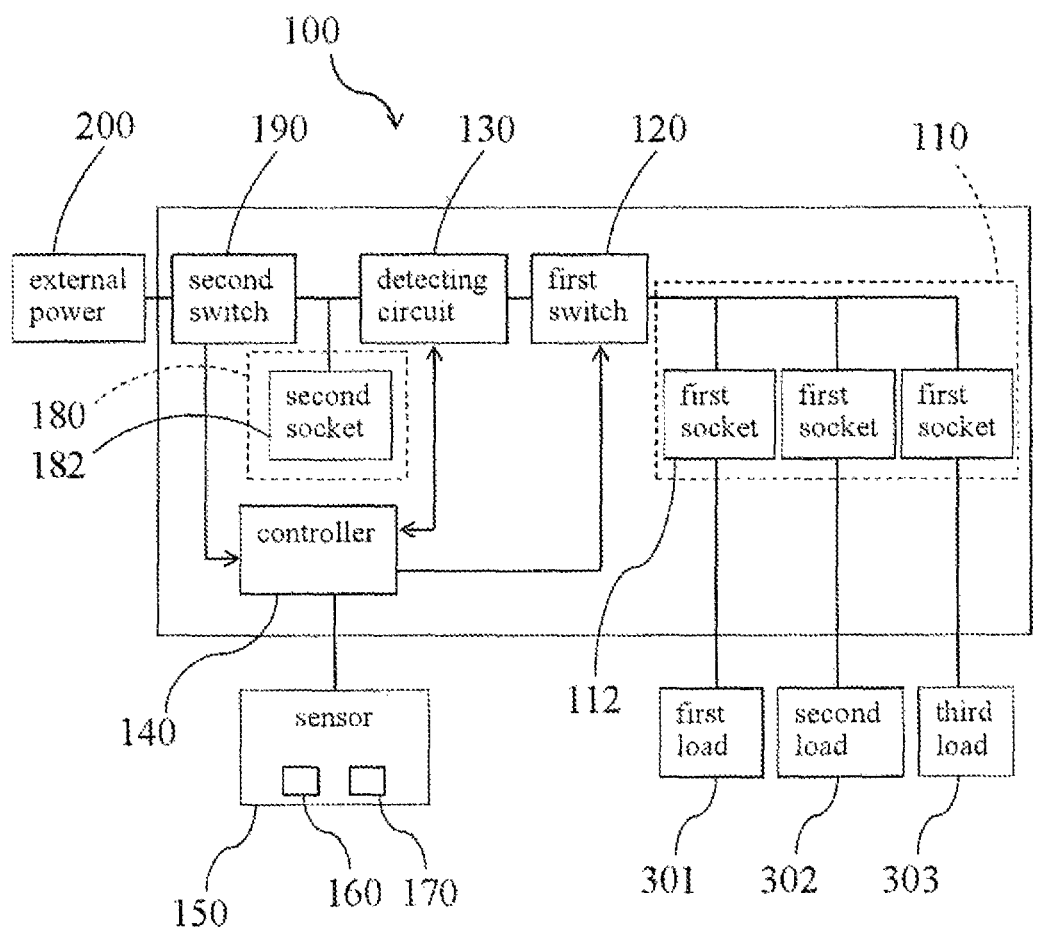
FIG. 1 is a schematic view illustrating a power outlet device according to one embodiment of the present invention.

FIG. 1 is a schematic view illustrating a power outlet device according to one embodiment of the present invention. Referring to FIG. 1, a power outlet device 100 of the present embodiment includes a first socket assembly 110, a first switch 120, a detecting circuit 130, a controller 140 and a sensor 150 mainly. In the present embodiment, the first socket assembly 110 is electrically coupled to an external power 200, and at least one load is electrically coupled to the first socket assembly 110. The external power 200 is, for example, a utility power. The first socket assembly 110 of the present embodiment has at least one first socket 112. The load is, for example, coupled to the first socket 112. Wherein, the first socket assembly 110 of the present embodiment is exemplified by applying three first sockets 112 in FIG. 1, and the present invention will not be limited to this. Correspondingly, there are also three loading devices illustrated in FIG. 1. The three loading devices are a first load 301, a second load 302 and a third load 303 respectively. In the present embodiment, the first load 301, the second load 302 and the third load 303 are, for example, constituted as an audio and video module. For example, the first load 301 can be a television, the second load 302 can be an audio and video player, and the third load 303 can be a speaker, and the present invention will not be limited to this.

From above, the first switch 120 of the present embodiment is electrically coupled to the first socket assembly 110. Wherein, the first switch 120 can be turned on or turned off the power supply of the external power 200 to the first socket assembly 110. In addition, the detecting circuit 130 is electrically coupled to the first socket assembly 110 through the first switch 120. Wherein, the detecting circuit 130 can detect a first power value of the first socket assembly 110 when the first switch 120 is turned on.

Worth mention, when the first switch 120 is turned on, the first load 301, the second load 302 and the third load 303 is in standby mode, and then the first power value is the power value of the first socket assembly 110 that is detected by the detecting circuit 130. In other words, when the first power value is detected by the detecting circuit 130, working power of the first load 301, the second load 302 and the third load 303 are still not turned on, and are in a standby mode. This is, the first power value is, for example, a standby power value.

Especially, when the first power value is detected by the detecting circuit 130 of the present embodiment, a second power value of the first socket assembly 110 also can be detected. Further, when the first power value like as the standby power value is detected by the detecting circuit 130 of the present embodiment, the detecting circuit 130 still can detect the instant power value of the first socket assembly 110 continuously. Wherein, the second power value is the instant power value of the first socket assembly 110.

In the present embodiment, the controller 140 of the present embodiment is electrically coupled to the first switch 120 and the detecting circuit 130 respectively. Thus, the controller 140 also can receive or read the first power value and the second power value in addition to control the on/off state of the first switch 120. Besides, a first signal is suitable for being received by the sensor 150, and then be transmitted to the controller 140. Thus, the controller 140 of the present embodiment turns on the first switch 120 or off according to the first signal, the first power value and the second power value. Wherein, the first signal is, for example, an infrared signal or other appropriate wireless signal sent by the corresponding remote controller of the first load 301, the second load 302 or the third load 303. Certainly, the first signal also can be sent by the corresponding remote controller of an external load (not shown), wherein the external load is not coupled to the first socket assembly 110, and the present invention will not be limited to this.

Further, in, the present embodiment, when the sensor 150 receives the first signal, the controller 140 turns on the first switch 120. Therefore, the detecting circuit 130 can detect the first power value and the second power value of the first socket assembly 110 through the first switch 120. Further, the controller 140 can receive or read the first power value (standby power value) and the second power value (the instant power value) for comparing. When the second power value is greater than the first power value, the controller 140 turns on the first switch 120 continuously. In other words, the first socket assembly 110 can be power supplied by the external power 200 continuously. Relatively, when the second power value is not greater than the first power value, the controller 140 turns off the first switch 120. In other words, the first socket assembly 110 is disconnected from the external power 200. Certainly, in the present embodiment, an acceptable tolerance is allowed in the comparison of the first power value and the second power value, and the present invention will not be limited to this.

For example, when the sensor 150 receives the first signal like as the infrared signal, the controller 140 turns on the first switch 120. Further, the detecting circuit 130 can detect the first power value of the first socket assembly 110. Further, when the first power value is detected by the detecting circuit 130, the second power value of the first socket assembly 110 can be detected later. Thus, the controller 140 can receive or read the first power value and the second power value for comparing, and then the working state of the first socket assembly 110 can be determined.

In detail, when the second power value (the instant power value) is greater than the first power value (standby power value), the controller 140 can determine that at least one of the first load 301, the second load 302 and the third load 303 is in normal operation. Thus, the controller 140 will not turn off the first switch 120 for continuously supplying the external power 200 to the first socket assembly 110 when the load, is in normal operation. Relatively, when the second power value is not greater than the first power value, the controller 140 can determine that the first load 301, the second load 302 and the third load 303 are in standby mode. Thus, the controller 140 turns off the first switch 120. In other words, the first socket assembly 110 is disconnected from the external power 200 for preventing energy loss. Therefore, the efficiency of energy saving can be achieved in the present invention.

On the other hand, when the first signal is sent by the corresponding remote controller of an external load (not shown) without coupling to the first socket assembly 110, the controller 140 turns on the first switch 120, so that the first socket assembly 110 is electrically coupled to the external power 200. If the first load 301, the second load 302 and the third load 303 are all in standby mode, the controller 140 still turns off the first switch 120 by comparing the first power value and the second power value for achieving the efficiency of energy saving.

Relatively, when the first signal is sent by the corresponding remote controller of at least one of the first load 301, the second load 302 and the third load 303, the controller 140 can turn on the first switch 120 so that the first socket assembly 110 is electrically coupled to the external power 200. Further, when it is at least one of the first load 301, the second load 302 and the third load 303 is in normal operation, the controller 140 makes the first switch 120 keep in ON state after comparing the first power value with the second power value, so as to continuously supply the external power 200 to the first socket assembly 110.

In one preferred embodiment, when the first power value (standby power value) of the first socket assembly 110 is detected by the detecting circuit 130, the controller 140 turns off the first switch 120 firstly for stopping the power supply of the external power 200 to the first socket assembly 110. In the embodiment, the sensor 150 also can receive a second signal. Wherein, when the sensor 150 receives the second signal, the first switch 120 can be turned on again so that the detecting circuit 130 can detect the second power value (the instant power value) of the first socket assembly 110. Similarly, the controller 140 of the present embodiment also turns on the first switch 120 or turn off according to the comparison of first power value and the second power value for achieving the efficiency of energy saving.

The foregoing second signal also can be an infrared signal or other appropriate wireless signal sent by the corresponding remote controller of the load coupled to the first socket assembly similarly. Certainly, the second signal also can be sent by the corresponding remote controller of an external load without coupling to the first socket assembly, and the present invention will not, be limited to this. Similar to the foregoing embodiment, regardless of whether the first signal and the second signal are sent by the corresponding remote controller of the load coupled to the first socket assembly, the controller 140 of the present embodiment can determine the working state of the first socket assembly 110 similarly by comparing the first power value and the second power value to, turn on or turn off the first switch 120 for achieving the efficiency of energy saving.

Figure 2:
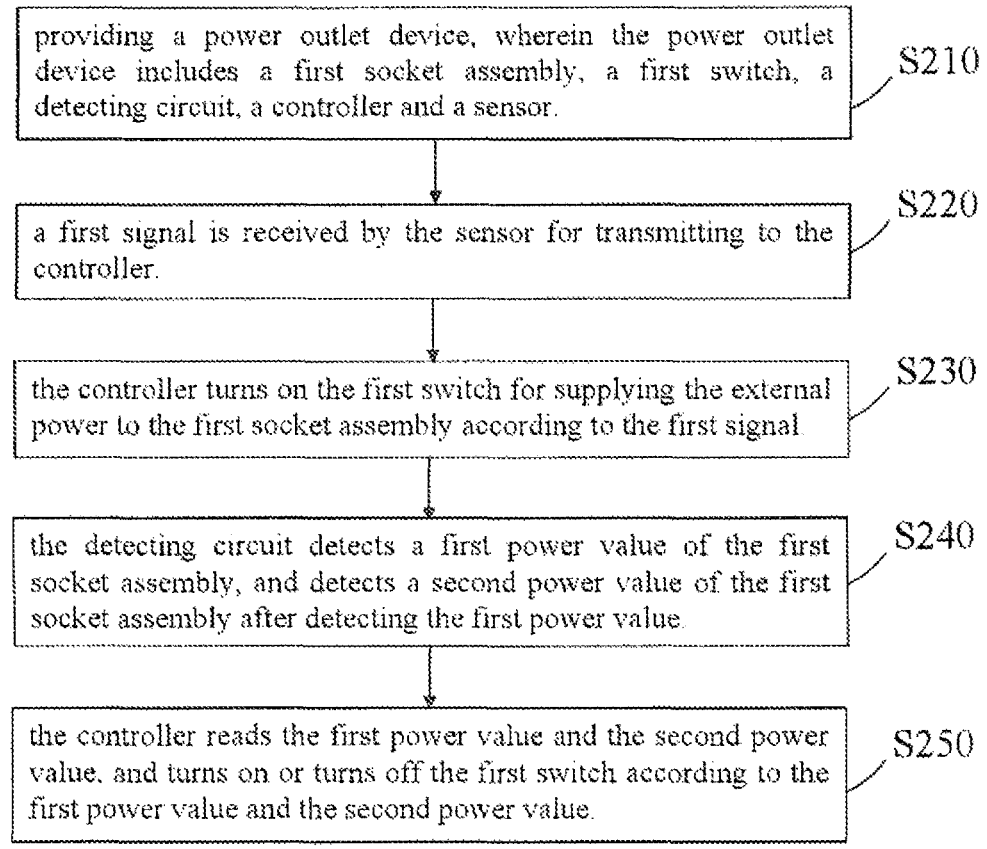
FIG. 2 is a flow chart illustrating a controlling method of power outlet device according to one embodiment of the present invention.

FIG. 2 is a flow chart illustrating a controlling method of power outlet device according to one embodiment of the present invention. Please refer to FIG. 2, in the present embodiment, the controlling method of the power outlet device includes the following steps. Firstly, in step S210, providing a power outlet device, wherein the power outlet device includes a first socket assembly, a first switch, a detecting circuit, a controller and a sensor. The first socket assembly of the present embodiment is electrically coupled to an external power, and has at least one first socket. Similar to the foregoing embodiment, in the present embodiment, at least one load is electrically coupled to the first socket assembly. In addition, the first switch is electrically coupled to the first socket assembly for turning on or turning off the power supply of the external power to the first socket assembly. Besides, the detecting circuit is electrically coupled to the first socket assembly through the first switch. The controller is electrically coupled to the first switch and the detecting circuit respectively.

After step S210, step S220 is executed, a first signal is received by the sensor for transmitting to the controller. The first signal is, for example, an infrared signal or other appropriate wireless signal sent by the corresponding remote controller of the load coupled to the first socket assembly. Certainly, the first signal also can be sent by the corresponding remote controller of an external load without coupling to the first socket assembly, and the present invention will not be limited to this. Next, in step S230, the controller turns on the first switch for supplying the external power to the first socket assembly according to the first signal. Next, in step S240, the detecting circuit detects a first power value of the first socket assembly, and detects a second power value of the first socket assembly after detecting the first power value. Wherein, the first power value is, for example, a standby power value of the first socket assembly. The second power value is, for example, an instant power value of the first socket assembly.

Next, in step S250, the controller reads the first power value, and the second power value, and turns on or turns off the first switch according to the first power value and the second power value. Certainly, the controller also can receive the first power value and the second power value directly, and turns on or turns off the first switch according to the first power value and the second power value. Simply, the first power value (standby power value) and the second power value (the instant power value) are compared by the controller for determining the working state of the first socket assembly. As described above, when the second power value is greater than the first power value, the controller determines that at least one of the loads coupled to the first socket assembly is in normal operation. Therefore, the controller makes the first switch keep in ON state for continuously supplying the external power to the first socket assembly. Relatively, when the second power value is not greater than the first power value, the controller can determine that all loads coupled to the first socket assembly are in standby mode. Therefore, the controller turns off the first switch. In other words, the first socket assembly is disconnected from the external power for preventing energy loss. Therefore, the efficiency of energy saving can be achieved in the present invention.

Figure 3:
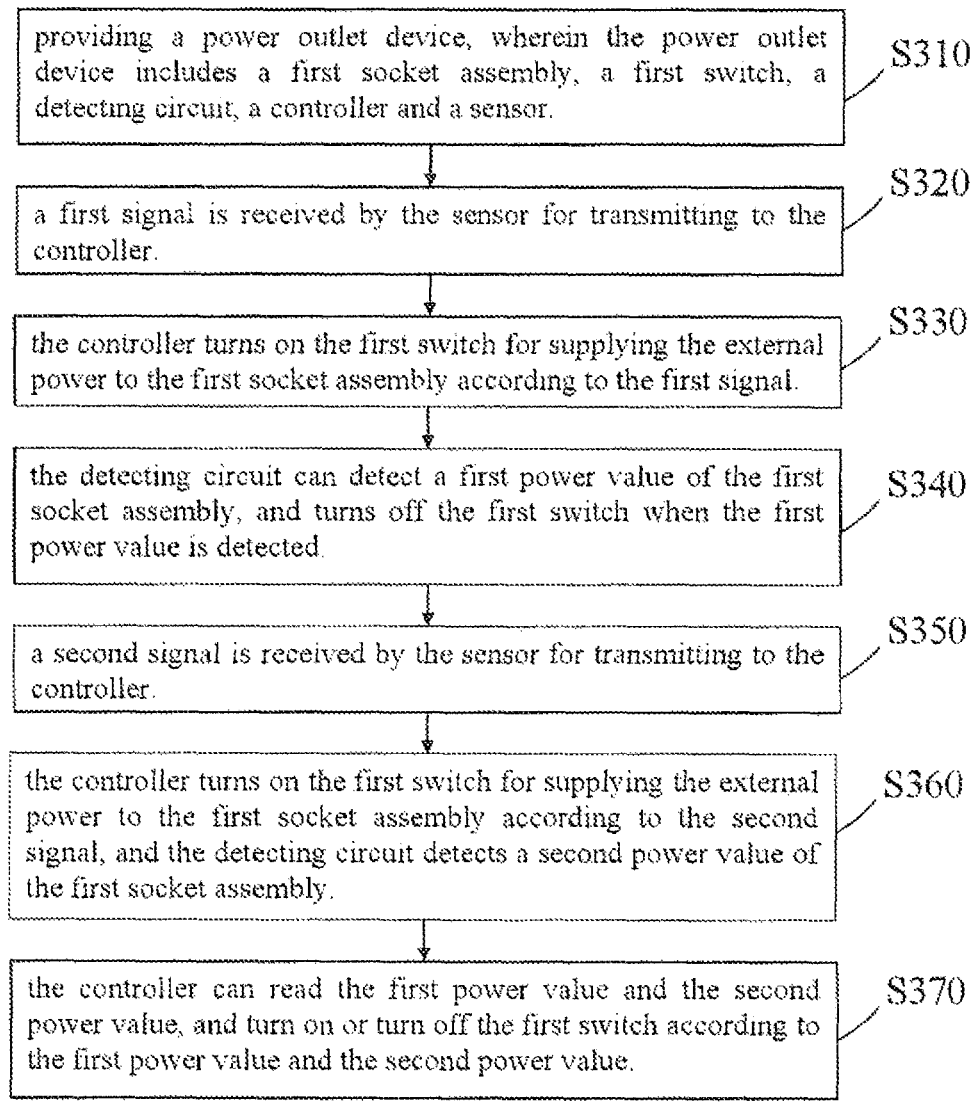
FIG. 3 is a flow chart illustrating a controlling method of power outlet device according to another embodiment of the present invention.

FIG. 3 is a flow chart illustrating a controlling method of power outlet device according to another embodiment of the present invention. Please refer to FIG. 3, the controlling method of the present embodiment is similar to the controlling method of the foregoing embodiment. The main difference between the two embodiments is that: in the controlling method of the present embodiment, the controller turns off the first switch firstly when the first power value (standby power value) of the first socket assembly is detected by the detecting circuit. When the sensor receives a second signal, the controller turn on the first switch for supplying the external power to the first socket assembly again according to the second signal, and the second power value of the first socket assembly can be detected by the detecting circuit.

Further, steps S310~S330 of the present embodiment are similar to steps S210~S230 of the foregoing embodiment. Especially, in the controlling method of the present embodiment, when the first socket assembly is power supplied by the external power according to the first signal (step S330), the detecting circuit can detect a first power value of the first socket assembly, and turns off the first switch when the first power value is detected (step S340). Next, in step S350, a second signal is received by the sensor for transmitting to the controller. Similarly, the second signal also can be an infrared signal or other appropriate wireless signal sent by the corresponding remote controller of the load coupled to the first socket assembly. Certainly, the second signal also can be sent by the corresponding remote controller of an external load without coupling to the first socket assembly, and the present invention will not be limited to this.

After step S350, step S360 is executed, the controller turns on the first switch for supplying the external power to the first socket assembly according to the second signal, and the detecting circuit detects, a second power value of the first socket assembly. Therefore, the controller can read the first power value and the second power value, and turn on or turn off the first switch according to the first power value and the second power value (step S370). Certainly, the controller also can receive the first power value and the second power value directly, and turn on or turn off the first switch according, to the first power value and the second power value. In the present embodiment, the first power value (standby power value) and the second power value (the instant power value) are also compared by the controller similarly for determining the working state of the first socket assembly. Therefore, the efficiency of energy saving can be achieved in the present invention.

From above, the power outlet device 100 of the present embodiment also can include a second socket assembly 180 and a second switch 190. The second socket assembly 180 has at least one second socket 182. Wherein, the second socket assembly 180 of the present embodiment is exemplified by applying one second socket 182 in FIG. 1, and the present invention will not be limited to this. In the present embodiment, the detecting circuit 130 is electrically coupled between the second socket assembly 180 and the first switch 120. The second socket assembly 180 and the detecting circuit 130 are electrically coupled to the second switch 190. In other words, the detecting circuit 130 is electrically coupled between the first switch 120 and the second switch 190. In addition, the controller 140 and the detecting circuit 130 are also coupled to the second switch 190. Wherein, the second switch 190 of the present embodiment is, for example, coupled to the external power 200 directly. Thus, when the second switch 190 is turned on, the elements electrically coupled between the second switch 190 and the first switch 120 can be power supplied by the external power 200 firstly. In other words, when an external load is electrically coupled to the second socket 182 and the second switch 190 is turned on, the external load can be power supplied by the external power 200. Similarly, when the second switch 190 is turned on, the detecting circuit 130, the controller 140 and the sensor 150 also can perform the corresponding work.

Especially, in one preferred embodiment the conduction of the second switch 190 also can triggers the conduction of the first switch 120 so that the detecting circuit 130 can detect the power value of the first socket assembly 110. In detail, when the second switch 190 is turned on, a third signal is transmitted to the controller 140, and the controller 140 turns on the first switch 120 according to the third signal. In other words, the conduction of the second switch 190 can triggers the conduction of the first switch 120 synchronously. Further, the detecting circuit 130 can detect the power value of the first socket assembly 110 quickly.

On the other hand, the power outlet device 100 of the present embodiment further includes a resetting unit 160 and a reminding unit 170. Wherein, the sensor 150, the resetting unit 160 and the reminding, unit 170 are, for example, integrated in a body, and connected with the controller 140 in wired or wireless way. In addition, the sensor 150, the resetting unit 160 and the reminding unit 170 also can integrated in the same body with the controller 140, and the present invention will not be limited to this.

In the present embodiment, the resetting unit 160 is, for, example, a button which can send a resetting signal to the controller 140. When the controller 140 receives the resetting signal, the controller turns on the first switch 120, and make the detecting circuit 130 detect the first power value of the first socket assembly 110. In other words, the power outlet device 100 of the present embodiment can reacquire the first power value (standby power value) of the first socket assembly 110 through the application of the resetting unit 160. Especially, when all loads coupled to the first socket assembly 110 are in standby mode, the first power value of the first socket assembly 110 can be acquired more effectively.

In addition, the reminding unit 170 of the present embodiment is, for example, a light emitting element or other appropriate elements. In the present embodiment, when the second power value is not greater than the first power value, the reminding unit 170 can receive a reminding signal sent by the controller 140 for generating a reminding message, and turns off the first switch 120. In detail, when the second power value of the first socket assembly 110 (the instant power value) is not greater than the first power value (standby power value), the power outlet device 100 of the present embodiment can send the reminding message through the reminding unit 170. The reminding message is represented that the first switch 120 will turn off soon and the power supply of the external power will be stopped to the first socket assembly 110. Besides, when the reminding message is generated by the reminding unit 170, any external signal can be received by the controller 140, the sensor 150 or other appropriate elements within a predetermined time for cancelling the disconnecting action of the first switch 120.

In one preferred embodiment, the power outlet device 100 further includes a timer (not shown). Thus, the first switch 120 can be turned off after the predetermined time by the assistance of the timer. Especially, when the sensor 150 does not sense any wireless signal within the predetermined time, it means that users may have no need to use these loads. Then, the present embodiment can send the reminding message through the reminding unit 170 by the assistance of the timer.

To sum up, the present invention can read the first power value (standby power value) of the first socket assembly and the second power value (the instant power value) and then compares the first power value and the second power value. Further, the working state of the first socket assembly can be determined. Further, when the loads coupled to the first socket assembly are in standby mode, the power supply of the external power can be stopped to the first socket assembly by for achieving the efficiency of energy saving. Certainly, when any load coupled to the first socket assembly is at working mode, the first socket assembly still can be powered by external power continuously for keeping the work of the load.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power outlet device, comprising:
   a first socket assembly coupled to an external power, having at least one first socket and at least one load is electrically coupled to the first socket assembly;
   a first switch, coupled to the first socket assembly for turning on or off power supply of the external power to the first socket assembly;
   a detecting circuit coupled to the first socket assembly through the first switch, detecting a first power value of the first socket assembly when the first switch is turned on, and then detects a second power value of the first socket assembly after detecting the first power value;
   a controller coupled to the first switch and the detecting circuit respectively, reading the first power value and the second power value; and
   a sensor, a first signal is received by the sensor for transmitting to the controller;
   wherein, the controller turns on or off the first switch according to the first signal, the first power value and the second power value.

2. The power outlet device of claim 1, wherein when the first switch is turned on, the load is in standby mode, and then the detecting circuit detects the first power value of the first socket assembly, the first power value is a standby power value.

3. The power outlet device of claim 1, wherein the controller turns on the first switch when the sensor receives the first signal, the controller turns on the first switch continuously when the second power value is greater than the first power value, the controller turns off the first switch when the second power value is not greater than the first power value.

4. The power outlet device of claim 1, further comprising a resetting unit and a reminding unit, the resetting unit sends a resetting signal to the controller, the controller turns on the first switch when receives the resetting signal, and makes the detecting circuit detect the first power value of the first socket assembly, and the reminding unit receives a reminding signal sent by the controller for generating a reminding message and turning off the first switch when the second power value is not greater than the first power value.

5. The power outlet device of claim 4, wherein the sensor, the resetting unit and the reminding unit are electrically coupled to the controller in wired or wireless way.

6. The power outlet device of claim 1, wherein the sensor is suitable for receiving a second signal, the controller turns off the first switch when the first power value of the first socket assembly is detected by the detecting circuit, and turns on the first switch again for detecting the second power value of the first socket assembly by the detecting circuit when the sensor receives the second signal.

7. The power outlet device of claim 6, wherein at least one of the first signal and the second signal is sent by the load or a corresponding remote controller of an external load without coupling to the first socket assembly.

8. The power outlet device of claim 1, further comprising a second socket assembly, the second socket assembly has at least one second socket, wherein the detecting circuit is electrically coupled between the second socket assembly and the first switch.

9. The power outlet device of claim 8, further comprising a second switch coupled to the external power, wherein the second socket assembly and the detecting circuit are electrically coupled to the second switch.

10. The power outlet device, of claim 9, wherein the controller and the detecting circuit are electrically coupled to the second switch, a third signal is suitable for transmitting to the controller when the second switch is, turned on, and the controller turns on the first switch according to the third signal.

11. A controlling method of a power outlet device, comprising:
    providing a power outlet device, the power outlet device includes a first socket assembly, a first switch, a detecting circuit, a controller and a sensor, wherein the first socket assembly is electrically coupled to an external power and has at least one first socket, and at least one load is electrically coupled to the first socket assembly, the first switch is electrically coupled to the first socket assembly for turning on or off power supply of the external power to the first socket assembly, the detecting circuit is electrically coupled to the first socket assembly through the first switch, the controller is electrically coupled to the first switch and the detecting circuit respectively;
    a first signal is received by the sensor for transmitting to the controller;
    the controller turns on the power supply of the external power to the first socket assembly according to the first signal;
    the detecting circuit detects a first power value of the first socket assembly, and then detects a second power value of the first socket assembly after detecting the first power value; and
    the controller reads the first power value and the second power value, and turns on or off the first switch according to the first power value and the second power value.

12. The controlling method of claim 11, wherein when the first switch is turned on, the load is in standby mode, and then the detecting circuit detects the first power value of the first socket assembly, the first power value is a standby power value.

13. The controlling method of claim 11, wherein the controller turns on the first switch when the sensor receives the first signal, the controller turns on the first switch continuously when the second power value is greater than the first power value, the controller turns off the first switch when the second power value is not greater than the first power value.

14. The controlling method of claim 11, wherein the power outlet device further includes a resetting unit and a reminding unit, the resetting unit sends a setting signal to the controller, the controller turns on the first switch when receives the resetting signal, and makes the detecting circuit detect the first power value of the first socket assembly, and the reminding unit receives a reminding signal sent by the controller for generating a reminding message and turning off, the first switch when the second power value is not greater than the first power value.

15. The controlling method of claim 14, wherein the sensor, the resetting unit and the reminding unit the controller in wired or wireless way.

16. The controlling method of claim 11, wherein the sensor is suitable for receiving a second signal, the controller turns off the first switch when the first power value of the first socket assembly is detected by the detecting circuit, and turns on the first switch again for detecting the second power value of the first socket assembly by the detecting circuit when the sensor receives the second signal.

17. The controlling method of claim 16, wherein at least one of the first signal and the second signal is sent by the load or a corresponding remote controller of an external load without coupling to the first socket assembly.

18. The controlling method of claim 11, wherein the power outlet device further comprising a second socket assembly, the second socket assembly has at least one second socket, wherein the detecting circuit is electrically coupled between the second socket assembly and the first switch.

19. The controlling method of claim 18, wherein, the power outlet device further comprising a second switch coupled to the external power, wherein the second socket assembly and the detecting circuit are electrically coupled to the second switch.

20. The controlling method of claim 19, wherein the controller and the detecting circuit are electrically coupled to the second switch, a third signal is suitable for transmitting to the controller when the second switch is turned on, and the controller turns on the first switch according to the third signal.

* * * * *